United States Patent [19]
Kotake

[11] Patent Number: 6,047,995
[45] Date of Patent: Apr. 11, 2000

[54] PIPE CONNECTOR

[75] Inventor: Naoyuki Kotake, Tokyo, Japan

[73] Assignee: Nitto Kohki Co., Ltd., Japan

[21] Appl. No.: 09/110,030

[22] Filed: Jul. 2, 1998

[30] Foreign Application Priority Data

Jul. 9, 1997 [JP] Japan .................................... 9-183318

[51] Int. Cl.$^7$ .................................................. F16L 55/00
[52] U.S. Cl. .............................. 285/85; 285/312; 285/924
[58] Field of Search ................... 285/84, 85, 86, 285/311, 312, 924, 91

[56] References Cited

U.S. PATENT DOCUMENTS

| | | | |
|---|---|---|---|
| 3,124,374 | 3/1964 | Krapp | 285/312 X |
| 4,691,942 | 9/1987 | Ford | 285/312 X |
| 4,802,694 | 2/1989 | Vargo | 285/312 X |
| 5,042,850 | 8/1991 | Culler | 285/924 X |
| 5,435,604 | 7/1995 | Chen | 285/85 X |
| 5,791,694 | 8/1998 | Fhal | 285/312 X |

FOREIGN PATENT DOCUMENTS 63-42237  11/1988  Japan .
64-5177   2/1989   Japan .

*Primary Examiner*—Dave W. Arola
*Attorney, Agent, or Firm*—Fulbright & Jaworski L.L.P.

[57] ABSTRACT

A pipe connector comprises a plug having a groove on the outer periphery of the distal end portion thereof, a socket having an axial hole to receive the distal end portion of the plug and a radial hole, a sealing member attached to the socket and sealing the plug and the socket, a lever pivotally mounted on the socket adjacent the radial hole and having a cam engagable with the groove through the radial hole, the lever being movable to a connected position, a half-connected position and a separated position. The cam is engaged with the groove and the sealing member is pressed, while the lever remains in the connected position, the cam is partly engaged with the groove and the sealing member is free from pressure, while the lever remains in the half-connected position, and the cam is disengaged from the groove, allowing the plug and the socket to move relative to each other, while the lever remains in the separated position. The pipe connector further comprises a locking mechanism for preventing the lever from moving with respect to the socket when the lever is in the connected and half-connected position.

20 Claims, 4 Drawing Sheets

PIPE CONNECTOR

BACKGROUND OF THE INVENTION

The present invention relates to a pipe connector of a lever-locking type, in which a socket and a plug are detachably connected to each other by means of an eccentric cam that is attached to the socket, and more specifically, to a pipe connector capable of preventing a plug from springing out under the residual internal pressure during separating operation.

Conventional pipe connectors are described in Jpn. UM Appln. KOKOKU Publication Nos. 64-5177 and 63-42237. In these connectors, a socket and a plug are detachably connected to each other by means of an eccentric cam on the socket side.

Referring now to FIGS. 6 and 7, an outline of the pipe connector described in Jpn. UM Appln. KOKOKU Publication No. 64-5177 will be described. FIG. 6 is a half-sectional view of the pipe connector, and FIG. 7 is a perspective view of the socket of the connector.

In FIGS. 6 and 7, numeral 100 denotes a socket of the pipe connector. A plug holding portion of the socket 100 has a pair of radially extending holes 101 on the diametrically opposite sides. A pair of brackets 102 are set up individually at the vicinity of each of the holes 101. A lever 104 having an eccentric cam 103 at its inner end portion is pivotally mounted on each pair of the brackets 102 by means of a shaft 105. The cam 103 can get into and out of the socket 100. A plug 106, which is fitted in the socket 100, has an engaging groove 107 in its outer peripheral portion, with which the eccentric cam 103 engages. When the lever 104 is brought down, as shown in FIG. 6, the engaged socket 100 and plug 106 are connected in a manner such that the cam 103 is fitted in the engaging groove 107 of the plug 106. When the lever 104 is raised, the cam 103 is disengaged from the groove 107 of the plug 106, whereupon the socket 100 and the plug 106 are allowed to separate from each other.

The pipe connector having this construction is provided with a lever locking stopper pin 108, which serves to prevent the connected socket 100 and plug 106 from unexpectedly separating from each other, that is, to prevent the lever 104 from rising to separate the two even if the lever 104 is urged to rise by any external force. Unless the stopper pin 108 is operated, according to this arrangement, the lever 104 never rises, so that the socket 100 and the plug 106 cannot be separated from each other.

Since the pipe connector is thus provided with the stopper pin 108 for preventing unexpected rising of the lever, the connected socket and plug can avoid being suddenly separated from each other by any external force. When the stopper pin is operated to raise the lever during the separating operation, however, the plug may possibly be caused to slip out of the socket by the residual internal pressure. Therefore, an operator must carry out the separating operation carefully by slowly operating the lever while securely holding the socket and the plug by his hands. Thus, the operation is troublesome.

BRIEF SUMMARY OF THE INVENTION

The object of the present invention is to solve the aforementioned conventional problem that a plug is caused unexpectedly to slip out of a socket by the residual internal pressure when the socket and the plug are separated from each other.

According to the present invention, there is provided a pipe connector, which comprises: a plug formed having at least one groove on the outer periphery of the distal end portion thereof; a socket having an axial hole to receive the distal end portion of the plug, and a radial hole arranged in a position that the radial hole faces the groove when the distal end portion of the plug is inserted in the axial hole; a sealing member attached to one of the plug and the socket and capable of sealing the gap between the plug and the socket in a fluid-tight manner; a lever having one end pivotally mounted on the socket in the vicinity of the radial hole and having a cam capable of engaging with the groove of the plug through the radial hole, the lever being movable to a connected position, a half-connected position and a separated position, wherein the cam is engaged with the groove, the sealing member is pressed, sealing the plug and the socket and preventing the plug and the socket from moving relative to each other, while the lever remains in the connected position; the cam is partly engaged with the groove, the sealing member is located between the plug and the socket, and the plug and the socket are separated from each other, while the lever remains in the half connected position; and the cam is disengaged from the groove, allowing the plug and the socket to move relative to each other, while the lever remains in the separated position; and a locking mechanism for preventing the lever from moving with respect to the socket when the lever is situated in the connected or half-connected position.

According to the pipe connector of the invention in a normal connected state, the lever is located in the connected position and held therein by means of the locking mechanism. Thereupon, the cam is engaged with the groove of the plug, and the plug and the socket are sealed by the sealing member and prevented from moving relatively to each other. Accordingly, the plug and the socket can be securely connected to each other without allowing a fluid therein to leak out. In separating the plug and the socket, the lever is located in the half-connected position and its movement is prevented by means of the locking mechanism. In this state, the cam is partially engaged with the groove of the plug, so that the plug and the socket are prevented from separating from each other, while sealing member is free from urging force by the plug or the socket. Thus, the residual internal pressure can be removed safely. By moving the lever to the separated position after the residual pressure is removed, the cam can be pulled out of the groove, whereupon the socket can be freely drawn out of the socket.

According to the pipe connector of the invention, therefore, the compressed fluid in the piping can be purged with the socket and the plug connected, so that the plug can be prevented from springing out under the residual internal pressure as the socket and the plug are separated from each other. Thus, the separating operation can be carried out easily and safely.

Preferably, the pipe connector further comprises a bracket protruding from the outer periphery of the socket and having the one end of the lever pivotally mounted thereon, and the locking mechanism includes a locking member slidably mounted on the lever and urged toward the one end of the lever, a first retaining portion arranged on the bracket and adapted to engage the locking member to prevent the lever from pivoting when the lever is in the connected position, and a second retaining portion arranged on the bracket and adapted to engage the locking member to prevent the lever from pivoting when the lever is in the half-connected position. In this case, the locking mechanism has a very simple construction.

Preferably, moreover, the locking mechanism includes longitudinal grooves formed individually along the opposite side portions of the lever, projections protruding from the locking member and held individually in the longitudinal grooves, and a spring held in at least one of the longitudinal grooves and urging the locking member toward the one end of the lever through the medium of the projections.

Preferably, furthermore, the locking mechanism includes a pin protruding from the lever and adapted to retain the locking member against the urging force.

According to the present invention, moreover, there is provided an apparatus for connecting a plug, having at least one groove on the outer periphery of the distal end portion thereof, with a socket having an axial hole to receive the distal end portion of the plug, which comprises: a radial hole formed in a position such that the radial hole faces the groove when the distal end portion of the plug is inserted in the axial hole of the socket; a lever having one end pivotally mounted on the socket in the vicinity of the radial hole and including a cam capable of engaging with the groove of the plug through the radial hole, the lever being movable between a connected position, in which the cam is fitted in the groove so that the socket is prevented from moving with respect to the plug, a half-connected position, in which the cam is partially engaged with the groove so that the socket is allowed limitedly to move with respect to the plug, and a separated position, in which the cam is disengaged from the groove so that the plug and the socket are allowed to move freely with respect to each other; and a locking mechanism for preventing the lever from rocking with respect to the socket when the lever is situated in the connected or half-connected position.

Preferably, this apparatus further comprises a bracket protruding from the outer periphery of the socket and having the one end of the lever pivotally mounted thereon, and the locking mechanism includes a locking member slidably mounted on the lever and urged toward the one end of the lever, a first retaining portion arranged on the bracket and adapted to engage the locking member to prevent the lever from pivoting when the lever is in the connected position, and a second retaining portion arranged on the bracket and adapted to engage the locking member to prevent the lever from pivoting when the lever is in the half connected position.

Preferably, moreover, the locking mechanism of this apparatus includes longitudinal grooves formed individually along the opposite side portions of the lever, projections protruding from the locking member and held individually in the longitudinal grooves, and a spring held in at least one of the longitudinal grooves and urging the locking member toward the one end of the lever through the medium of the projections.

Preferably, furthermore, the pin protruding from the lever is designed to retain the locking member against the urging force.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

A pipe connector according to a preferred embodiment of the present invention will now be described in detail with reference to the accompanying drawings, in which.

DETAILED DESCRIPTION OF THE INVENTION

Figure 1:
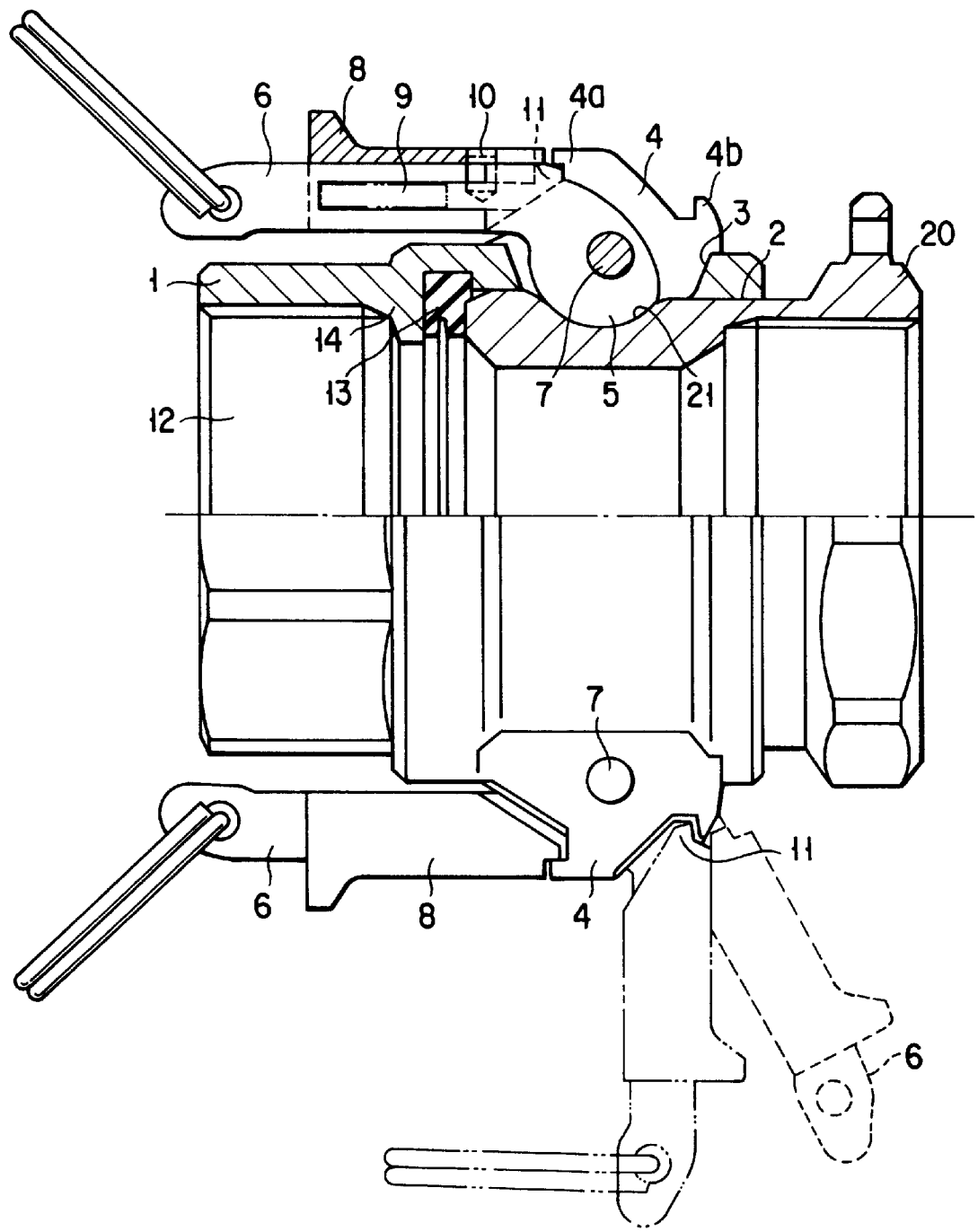
FIG. 1 is a half-sectional view of the pipe connector.

FIG. 1 is a half-sectional view of a pipe connector according to an embodiment of the present invention, showing a connected state and a half-connected state of a socket and a plug which compose the pipe connector.

Figure 2:
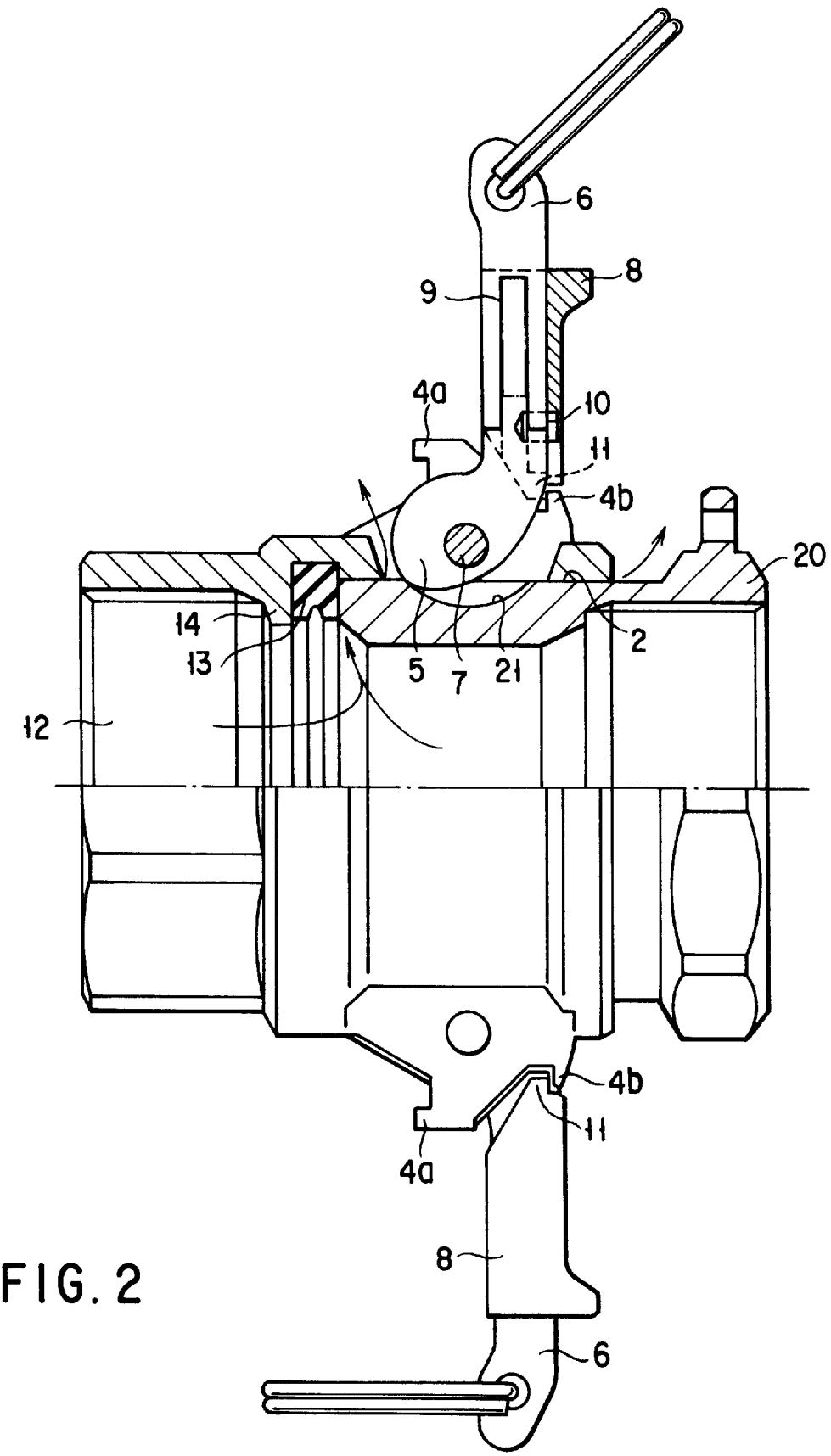
FIG. 2 is a half-sectional view of the pipe connector of FIG. 1 with its levers raised.
Figure 3:
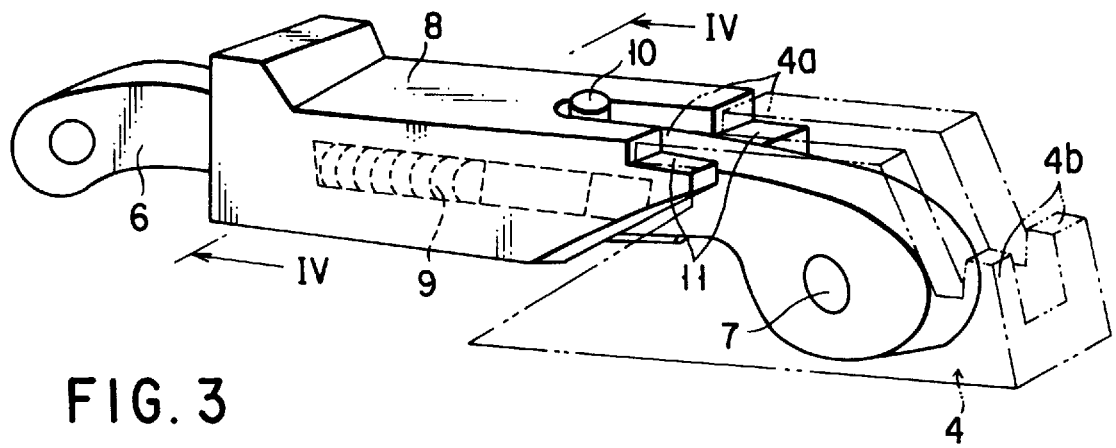
FIG. 3 is a perspective view schematically showing an assembled state of a lever and a locking member to be attached to a socket.

In FIGS. 1 and 2, numeral 1 denotes a socket. A plug holding portion 2 of the socket 1 has two diametrically opposed holes 3 which extend radially therethrough, as in the conventional case. Two brackets 4 are provided, opposing each other, with one hole 3 located between them. A lever 6 having an eccentric cam 5 at its inner end portion is pivotally mounted on each bracket 4 by means of a shaft 7. The cam 5 can get into and out of the socket 1. A stepped portion 14 for retaining a sealing gasket 13 is formed in a passage 12 in the socket 1.

Each bracket 4 has a first retaining portion 4a for keeping the lever 6 retracted and a second retaining portion 4b for keeping the lever 6 raised. These retaining portions and locking members (mentioned later) constitute a locking mechanism.

When the levers 6 are brought down, as shown in FIG. 1, a locking member 8, which will be described in detail later, on the lever side engages the first retaining portion 4a (first locked state of the locking mechanism). In this state, the lever 6 cannot be unexpectedly raised by any external force. When the lever 6 is raised, as indicated by an alternate long and two short dashes line in the lower half of FIG. 1, the locking member 8 engages the second retaining portion 4b of the bracket 4 (second locked state of the locking mechanism). In this state, the lever 6 in the raised state of FIG. 1 cannot rotate further counter-clockwise to the position indicated by a dotted line unless the locking member 8 is operated. Thus, the socket 1 and the plug cannot be separated from each other.

The eccentric cam 5 is formed on the inner end portion of the lever 6 that is pivotally mounted on each bracket 4. When the lever 6 is brought down, the cam 5 projects from the inner peripheral surface of the socket 1 toward the center, so that it can engage the engaging groove 21 of the plug 20. When the lever 6 is raised, part of the cam 5 can engage part of the engaging groove 21 on the plug 20, as shown in FIG. 2. The locking member 8 is slidably mounted on the lever 6. The member 8 is urged to the right when viewed in FIG. 1 by means of the urging force of a spring 9 (mentioned later), which is interposed between the member 8 and the lever 6, and is prevented from moving further by a pin 10 that protrudes from the lever 6.

Figure 4:
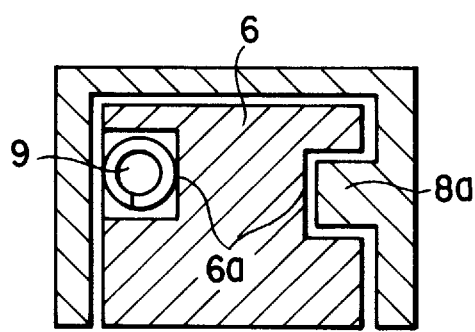
FIG. 4 is a sectional view taken along line IV—IV of FIG. 3.
Figure 5:
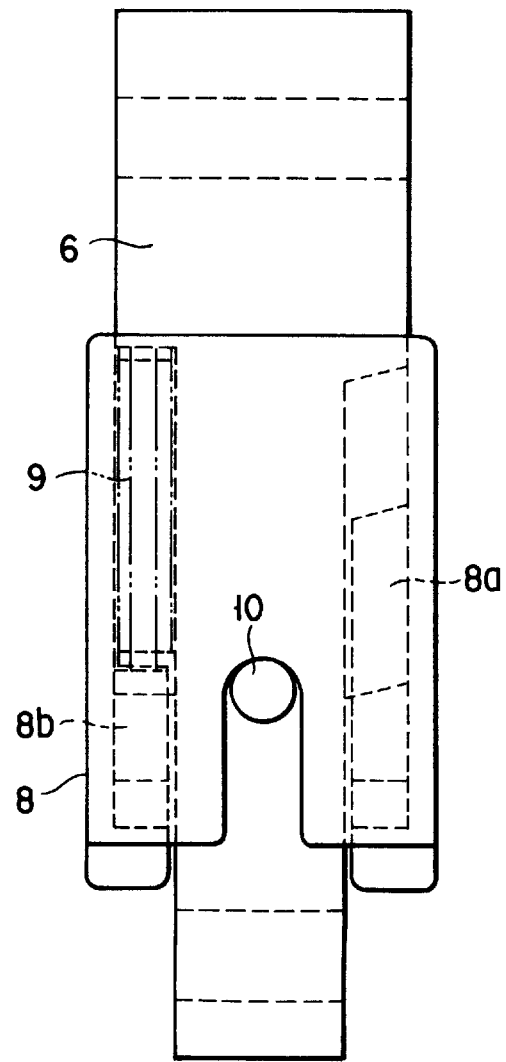
FIG. 5 is a plan view schematically showing the assembled state of the lever and the locking member.
Figure 6:
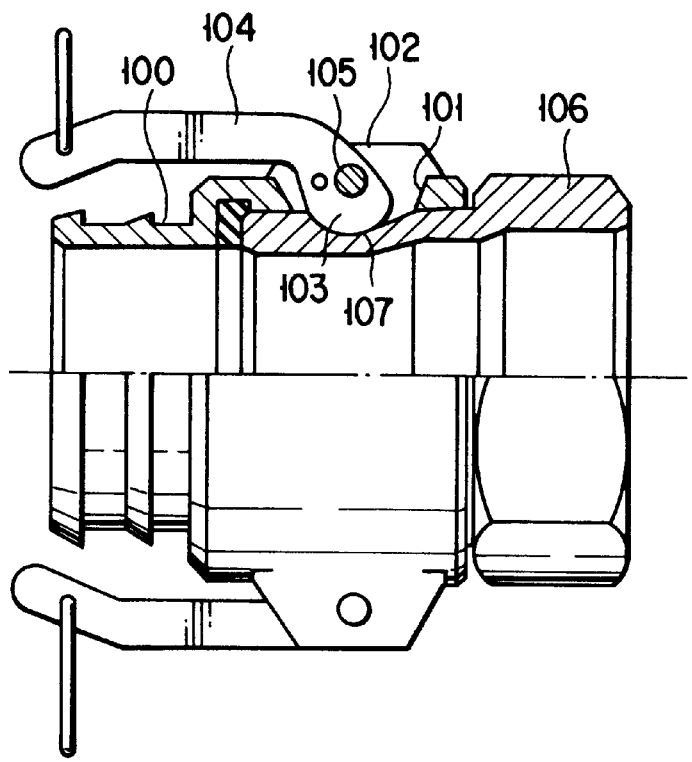
FIG. 6 is a half-sectional view of a prior art pipe connector.
Figure 7:
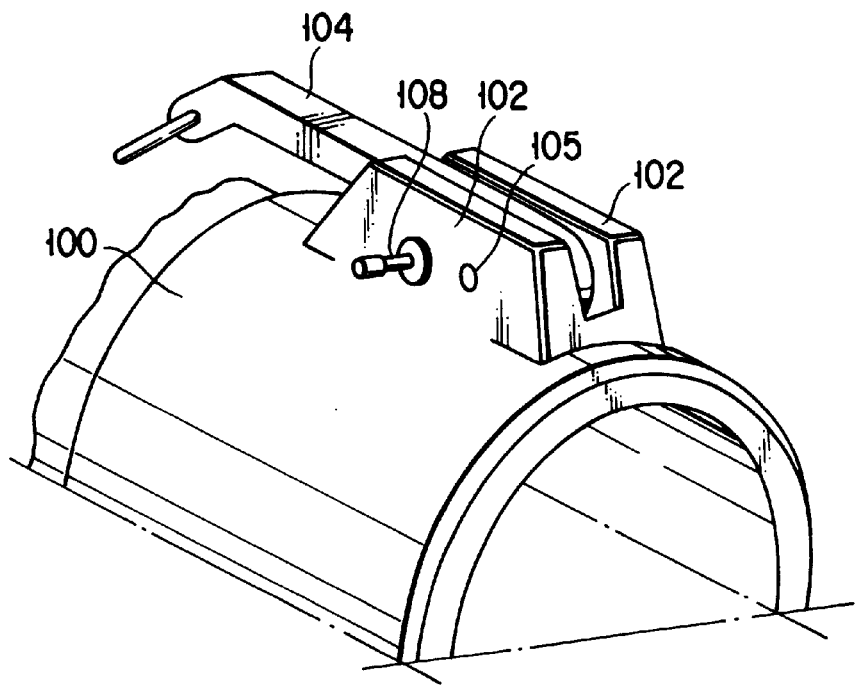
FIG. 7 is a perspective view of a socket of the prior art pipe connector.

As shown in FIGS. 4 and 5, the lever 6 has longitudinal grooves 6a on the opposite sides thereof. A guide 8a that protrudes from the locking member 8 engages with the one of the grooves 6a. The spring 9 for urging the locking member 8 engages with the other groove 6a. Further, a guide 8b (see FIG. 5) that protrudes from the locking member 8 engages with the other groove 6a. Thus, the locking member 8 is urged against the pin 10 by the urging force of the spring 9 through the guide 8b on one side, as mentioned above.

The locking member 8 is formed with an engaging portion 11 that engages the first and second retaining portions 4a and 4b on each bracket 4. When the lever 6 is brought down, as shown in the solid line in FIG. 1, the engaging portion 11 of the locking member 8, which is urged toward the first retaining portion 4a by the spring 9, engages with the first retaining portion 4a (first locking function), whereupon the lever 6 is locked. When the lever 6 is raised, as shown in FIG. 2, on the other hand, the engaging portion 11 of the locking member 8, which is urged toward the second retaining portion 4b by the spring 9, engages with the second retaining portion 4b (second locking function), whereupon the lever 6 is locked in the raised state. In the locked state, it is preferable that a gap is provided between the pin 10 protruding from the lever 6 and the locking member 8 so as not to interfere with the function of the member 8.

The plug 20 to be connected to the socket 1 has the engaging groove 21 on its outer periphery that engages with the eccentric cam 5. When the cam 5 engages with the groove 21, socket 1 and the plug 20 are connected to each other.

The following description is the operations for connecting and separating the pipe, connector constructed above manner.

Connecting Operation

When the lever 6 of the socket 1 is inclined or rated toward the plug 20, as indicated by the dotted line in the lower half of FIG. 1, the eccentric cam 5 of the lever 6 does not project from the inner surface of the socket 1. Therefore, the plug 20 can be inserted freely into the socket 1. After the lever 6 is arranged in this position, the plug 20 is inserted into the socket 1 so that its distal end abuts against the sealing gasket 13. In this state, the locking member 8 on the lever 6 is pulled against the urging force of the spring 9 to bring down the lever 6 to the left. When the locking member 8 is released, its engaging portion 11 is caused to engage with the first retaining portion 4a of the bracket 4 by the urging force of the spring 9, whereupon the first locked state is established. Further, the eccentric cam 5 of the lever 6 is engaged with the engaging groove 21 of the plug 20 so that the socket 1 and the plug 20 are connected to each other. Since the lever 6 is locked in this manner, the socket 1 and the plug 20 are prevented from separating from each other. In this state, the sealing gasket 13 in the socket 1 is pressed by the distal end of the plug 20, whereby the passage 12 is sealed to prevent the compressed fluid therein from leaking out.

Separating Operation

In separating the connected plug 20 and socket 1 of the pipe connector, the locking member 8 is pulled against the urging force of the spring 9 so that it is disengaged from the first retaining portion 4a of the bracket 4 (first locked state is canceled), and the lever 6 is rotated around the shaft 7. When the lever 6 is rotated substantially at right angles to the axis of the socket 1, thereafter, the locking member 8, urged by means of the spring 9, engages the second retaining portion 4b of the bracket 4 again to establish the second locked state. At this time, part of the eccentric cam 5 is still engaged with the engaging groove 21, so that the socket 1 and the plug 20 are prevented from separating from each other. On the other hand, the sealing gasket 13 in the socket 1 is released from the pressing force by the distal end of the plug 20, so that the sealing by the gasket 13 is canceled. As a result, the compressed fluid in the passage 12 is discharged to the outside through the gap between the sealing gasket 13 and the distal end of the plug 20, so that the residual internal pressure is reduced to zero. In this state, an operator pulls the lever 6 against the urging force of the spring 9 so that the lever 6 is inclined further to the plug side. Thereupon, the eccentric cam 5 is disengaged from the engaging groove 21 of the plug 20, so that the socket 1 and the plug 20 are allowed to be separated from each other. Thus, in the pipe connector according to the present embodiment, the lever 6 can be locked in two stages, so that the socket 1 and the plug 20 can be easily separated from each other, and the plug 20 can be prevented from springing out under the residual internal pressure.

According to the embodiment described above, the engaging portion 11 formed on the locking member 8 is adapted to engage the first and second retaining portions 4a and 4b. The locking mechanism is not limited to the aforesaid arrangement, and may be arranged variously. Although the pipe connector described above uses two sets of levers and grooves, it may be provided with one set or three or more sets of levers and grooves. In the case where a plurality of sets are used, only one of them may be provided with a locking mechanism.

It is to be understood that the present invention is not limited to the embodiment described above, and that various changes and modifications may be effected therein by one skilled in the art without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A pipe connector comprising:

a plug having at least one groove on the outer periphery of the distal end portion thereof;

a socket having an axial hole to receive the distal end portion of the plug, and a radial hole arranged in a position that the radial hole faces the groove when the distal end portion of the plug is inserted in the axial hole;

a sealing member attached to one of the plug and the socket and capable of sealing the gap between the plug and the socket in a fluid-tight manner;

a lever having one end pivotally mounted on the socket in the vicinity of the radial hole and having a cam capable of engaging with the groove of the plug through the radial hole, the lever being movable to a connected position, a half-connected position and a separated position, wherein the cam is engaged with the groove, the sealing member is pressed, sealing the plug and the socket and preventing the plug and the socket from moving relative to each other, while the lever remains in the connected position; the cam is partly engaged with the groove, a sealed state, in which the plug and the socket are sealed by the sealing member, is released and the plug and the socket are prevented from separating from each other, while the lever remains in the half-connected position; and the cam is disengaged from the groove, allowing the plug and the socket to move relative to each other, while the lever remains in the separated position; and a locking mechanism cooperating with the lever and engaging a portion of the socket for preventing the lever from moving with respect to the socket when the lever is situated in the connected or half-connected position.

2. A pipe connector according to claim 1, in which further comprises a bracket protruding from the outer periphery of the socket and having the one end of the lever pivotally mounted thereon, and wherein said locking mechanism includes a locking member slidably mounted on the lever and urged toward the one end of the lever, a first retaining portion arranged on the bracket and engaging the locking member to prevent the lever from pivoting when the lever is in the connected position, and a second retaining portion arranged on the bracket and engaging the locking member to prevent the lever from pivoting when the lever is in the half-connected position.

3. A pipe connector according to claim 2, wherein said locking mechanism includes longitudinal grooves formed individually along the opposite side portions of the lever, projections protruding from the locking member and held individually in the longitudinal grooves, and a spring held in at least one of the longitudinal grooves and urging the locking member toward the one end of the lever through the medium of the projections.

4. A pipe connector according to claim 2, wherein said locking mechanism includes a pin protruding from the lever and retaining the locking member against the urging force.

5. An apparatus for connecting a plug having at least one groove on the outer periphery of the distal end portion thereof, with a socket having an axial hole to receive the distal end portion of the plug, comprising:

a radial hole formed in a position such that the radial hole faces the groove when the distal end portion of the plug is inserted in the axial hole of the socket;

a lever having one end pivotally mounted on the socket in the vicinity of the radial hole and including a cam capable of engaging with the groove of the plug through the radial hole, the lever being movable to a connected position, in which the cam is engaged in the groove so that the socket is prevented from moving with respect to the plug, a half-connected position, in which the cam is partially engaged with the groove so that the socket is allowed limitedly to move with respect to the plug, and a separated position, in which the cam is disengaged from the groove so that the plug and the socket are allowed to move freely with respect to each other; and a locking mechanism cooperating with the lever and engaging a portion of the socket for preventing the lever from pivoting with respect to the socket when the lever is situated in the connected or half-connected position.

6. An apparatus according to claim 5, which further comprises a bracket protruding from the outer periphery of the socket and having the one end of the lever pivotally mounted thereon, and wherein said locking mechanism includes a locking member slidably mounted on the lever and urged toward the one end of the lever, a first retaining portion arranged on the bracket and engaging the locking member to prevent the lever from pivoting when the lever is in the connected position, and a second retaining portion arranged on the bracket adapted to engage the locking member to prevent the lever from pivoting when the lever is in the half-connected position.

7. An apparatus according to claim 6, wherein said locking mechanism includes longitudinal grooves formed individually along the opposite side portions of the lever, projections protruding from the locking member and held individually in the longitudinal grooves, and a spring held in at least one of the longitudinal grooves and urging the locking member toward the one end of the lever through the medium of the projections.

8. An apparatus according to claim 6, wherein said locking mechanism includes a pin protruding from the lever and retaining the locking member against the urging force.

9. A pipe connector comprising:

a plug;

a socket having an axial hole to receive the plug, and a radial hole in a sidewall of the socket;

a seal positioned between the plug and socket for forming a fluid-tight coupling therebetween;

a lever having one end pivotally mounted on the socket and a cam positionable in said radial hole and engaging said plug therethrough so as to retain and longitudinally position said plug within said axial hole, the lever being positionable into (i) a closed position having said cam engaging said plug so as to fully maintain and urge said plug in and into said axial hole, (ii) a pressure release position having said cam engaging said plug in an intermediate position so as to retain said plug within a portion of said axial hole and provide a gap between said plug and socket for the release of a fluid pressure therebetween, and (iii) an open position wherein said cam is disengaged from said plug; and a locking mechanism maintaining said lever in said closed and pressure release positions.

10. The pipe connector according to claim 9 wherein said locking mechanism includes a locking member connected to the lever and retaining portions formed on the socket for locking said lever in the closed and pressure release positions.

11. The pipe connector according to claim 10 wherein said locking member is positionable relative to said lever for selectively engaging and disengaging said retaining portions.

12. The pipe connector according to claim 10 further comprising a spring urging said locking member toward engagement of said retaining portions.

13. The pipe connector according to claim 9 wherein said seal comprises a gasket.

14. The pipe connector according to claim 9 wherein said locking mechanism comprises a locking member attached to said lever and, said locking member engaging a retaining portion of said socket with said lever positioned in said closed and pressure release positions.

15. The pipe connector according to claim 14 wherein said locking mechanism further comprises a spring urging said locking member toward engagement of said retaining portion of said socket.

16. The pipe connector according to claim 15 wherein said retaining portion of said socket comprises first and second engagement surfaces formed on a common bracket attached to said socket.

17. The pipe connector according to claim 9 wherein said cam is eccentric about a rotation point of said lever.

18. The pipe connector according to claim 9 wherein said plug includes a groove engaged by said lever through said radial hole with said plug in said axial hole and said lever in said closed and pressure release positions.

19. The pipe connector according to claim 9 wherein a gap is formed between said seal and said plug with said lever in said pressure release position for said release of said fluid pressure.

20. The pipe connector according to claim 9 wherein said radial hole comprises a plurality of throughholes symmetrically spaced in said sidewall of said socket and said lever includes a plurality of levers and cams, said cams extending into respective ones of said throughholes and engaging underlying portions of said plug.

* * * * *